G. M. EATON.
ELECTRIC LOCOMOTIVE.
APPLICATION FILED MAR. 15, 1909.

975,404.

Patented Nov. 15, 1910.

2 SHEETS—SHEET 1.

WITNESSES:
C. L. Belcher
Otto S. Schairer

INVENTOR
George M. Eaton
BY
Wesley G. Carr
ATTORNEY

G. M. EATON.
ELECTRIC LOCOMOTIVE.
APPLICATION FILED MAR. 15, 1909.

975,404.

Patented Nov. 15, 1910.
2 SHEETS—SHEET 2.

WITNESSES:
C. L. Belcher
Otto S. Schairer

INVENTOR
George M. Eaton
BY
ATTORNEY

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

975,404.  Specification of Letters Patent.  Patented Nov. 15, 1910.

Application filed March 15, 1909. Serial No. 483,635.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric Locomotives, of which the following is a specification.

My invention relates to electrically propelled vehicles and particularly to locomotives which are propelled by alternating current motors.

It has been found, in practice, that the operation of electric motors for driving railway vehicles by means of alternating currents of low frequency, as, for example, 15 cycles per second, results in such variations in the driving torque exerted as to cause objectionable vibrations unless proper precautions are taken to avoid this difficulty.

The object of my invention is to provide means for so mounting electric motors upon locomotive frames that the vibrations above referred to shall not be transmitted to the main structural elements of the locomotive.

According to my present invention, I provide a pivotal mounting for each motor at the normal center of oscillation and so combine the mounting with the coöperating members of the truck as to obviate, to a considerable extent, the difficulties otherwise encountered.

Figure 1:
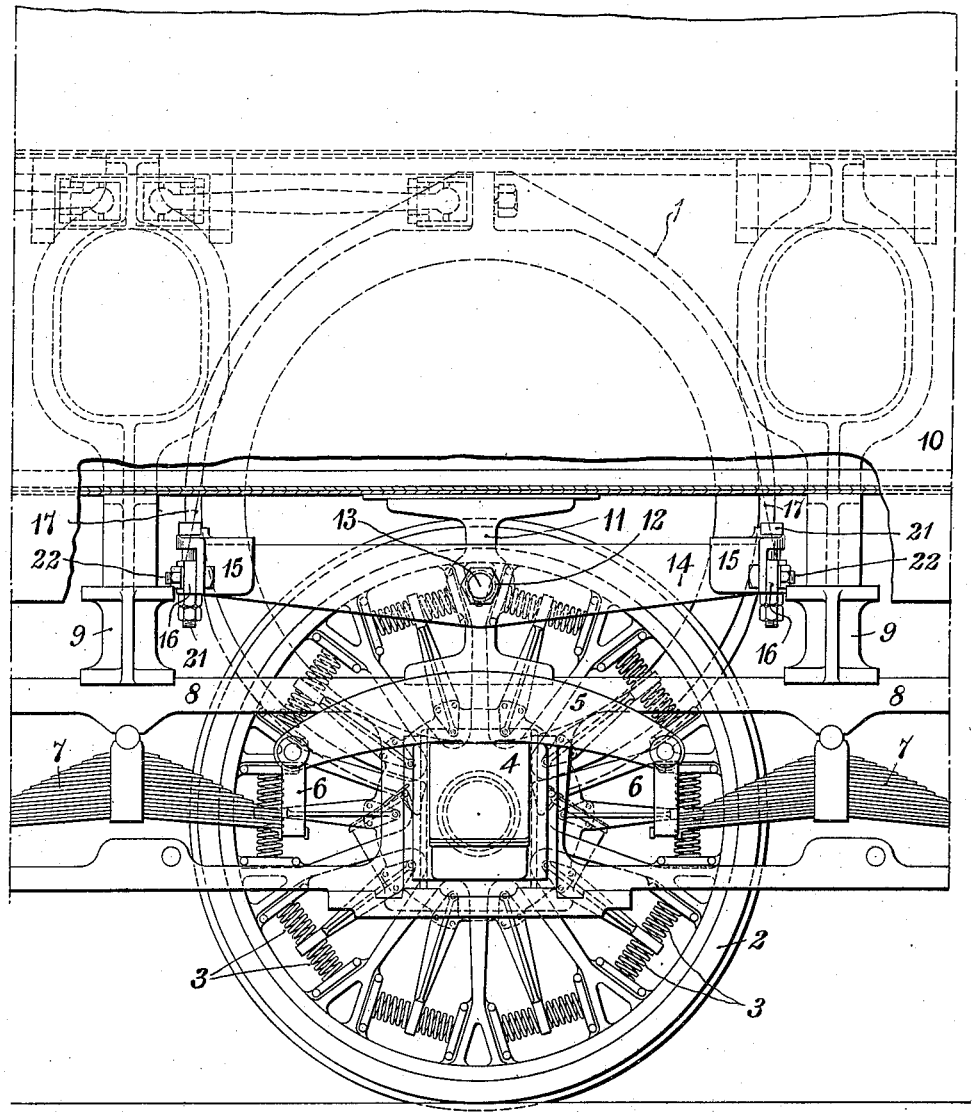
Figure 2:
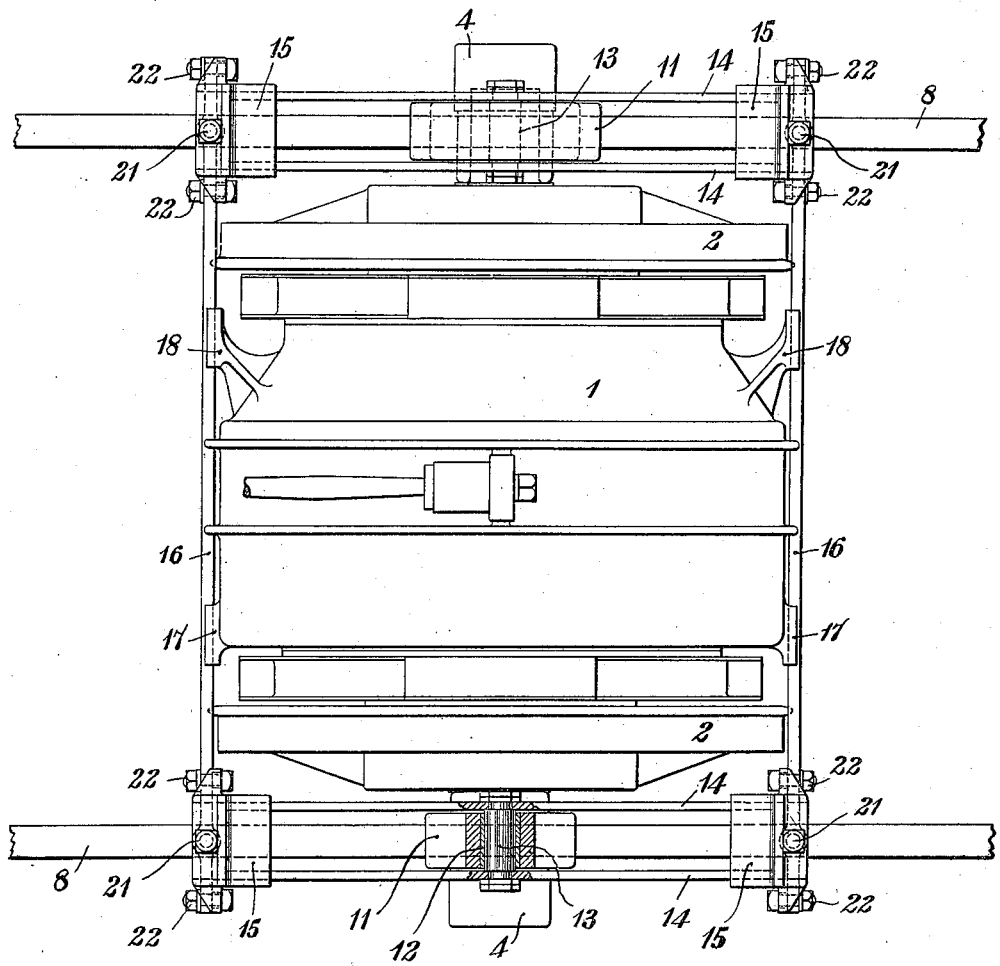

In the accompanying drawings, Figure 1 is a view, in side elevation, of a portion of a locomotive embodying my invention, parts of the structure being broken away to more clearly illustrate the invention. Fig. 2 is a plan view of a portion of the structure shown in Fig. 1, a number of the parts being omitted to permit of better illustration of the important features.

A locomotive which is equipped in accordance with my invention will ordinarily be driven by a plurality of motors, but it will be sufficient for the purpose of setting forth the invention to show a single motor 1 and a single pair of driving wheels 2. In this case, the motor is mounted between and above the wheels and is geared thereto in any suitable manner, cushioning springs 3 being shown as interposed between the spokes of the wheel and the motor gearing.

Supported upon the axle boxes 4 are dolphin bars 5 from the ends of which depend links 6 and upon these links are supported the ends of leaf springs 7. Upon the middle portions of the springs 7 are supported the beams 8 of the truck frame and on these beams are supported transverse beams 9 which, in turn, support the cab 10 of the vehicle.

Supported upon the beams 8, substantially in the plane of the wheel axle and the motor shaft, are standards 11 in form of I-beams, the upper parts of which partially support, and are, in turn, braced by, the floor of the cab. The middle portions of the supporting standards 11 are provided with bearings 12 in which are located short shafts 13, the ends of which engage and support the middle portions of beams 14. On the ends of the beams 14 are secured saddles 15 to which are adjustably fastened the ends of cross bars 16 and upon the cross bars 16 the motor 1 is supported by means of projecting arms or lugs 17 and 18.

It will be seen that the members 14 and 16, together with the saddles 15 at their meeting ends, constitute a cradle, to which the motor frame is securely attached at its opposite sides and that the ends of this cradle are pivotally supported in the standards 11.

In order that the position of the motor may be adjusted with reference to the truck frame to compensate for sag of the springs 7, I provide bolts 21 and 22, the former being employed for adjusting the side bars 16 vertically and the latter for clamping the bars in their adjusted positions. The bolts 21 and 22 will also permit of interchangeability of motors without necessitating exact accuracy in machining all parts of the frame and cradle.

It will be noted that considerable variation is possible in the height of the pivots 13 and that these pivots may be located, by calculation or by trial, at the normal center of oscillation of the masses subject to vibration by reason of torque pulsation, thus minimizing the transmission of vibrations to the locomotive structure.

I claim as my invention:

1. In an electrically propelled vehicle, the combination with a truck and a propelling motor, of a skeleton cradle in which the motor is mounted, standards supported upon one of the main structural elements of the truck and means for pivotally mounting said cradle in said standards.

2. In an electrically propelled vehicle, the combination with a truck and a propelling motor, of a pair of standards mounted on one of the main structural elements of the truck directly over the axle, a rectangular frame upon which the motor frame is rigidly supported, and means for pivotally supporting said frame in said standards.

3. In an electrically propelled vehicle, the combination with a truck and a cradle comprising side and end bars, of an electric motor mounted upon the side bars of the cradle, and means for vertically adjusting said cradle side bars.

4. In an electrically propelled vehicle, the combination with a truck and a cradle having its end members pivotally supported by the truck frame and provided with means for effecting vertical adjustments of its side members, of an electric motor supported by said cradle side members.

5. In an electrically propelled vehicle, the combination with a cradle having vertically adjustable side members, of a motor supported by said side members, and a truck upon which the end members of the cradle are pivotally supported at the normal center of oscillation.

6. In an electrically propelled vehicle, the combination with a truck and a cradle comprising end bars and relatively adjustable side bars, of a propelling motor mounted upon the cradle side bars, and standards upon which the cradle end bars are pivotally supported.

In testimony whereof, I have hereunto subscribed my name this 24th day of February, 1909.

GEORGE M. EATON.

Witnesses:
J. W. MAHONEY,
B. B. HINES.